(12) United States Patent
Sim et al.

(10) Patent No.: US 11,828,458 B2
(45) Date of Patent: Nov. 28, 2023

(54) STEAM GENERATOR AND COOKING APPARATUS INCLUDING STEAM GENERATOR

(71) Applicant: LG ELECTRONICS INC., Seoul (KR)

(72) Inventors: Hoonseob Sim, Seoul (KR); Jaekyung Yang, Seoul (KR); Suyong Lee, Seoul (KR); Yongsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 801 days.

(21) Appl. No.: 16/481,053

(22) PCT Filed: Jan. 23, 2018

(86) PCT No.: PCT/KR2018/001035
§ 371 (c)(1),
(2) Date: Jul. 25, 2019

(87) PCT Pub. No.: WO2018/139840
PCT Pub. Date: Aug. 2, 2018

(65) Prior Publication Data
US 2020/0018475 A1 Jan. 16, 2020

(30) Foreign Application Priority Data
Jan. 26, 2017 (KR) .................. 10-2017-0012896

(51) Int. Cl.
*F22B 1/28* (2006.01)
*A47J 27/04* (2006.01)
(Continued)

(52) U.S. Cl.
CPC .............. *F22B 1/28* (2013.01); *A47J 27/04* (2013.01); *F22B 1/282* (2013.01); *F22B 1/284* (2013.01);
(Continued)

(58) Field of Classification Search
None
See application file for complete search history.

(56) References Cited

U.S. PATENT DOCUMENTS

| 5,223,696 A | 6/1993 | Violi |
| 2005/0095168 A1 | 5/2005 | Centanni et al. |

(Continued)

FOREIGN PATENT DOCUMENTS

| CN | 101268306 A | * | 9/2008 | .............. F22B 17/04 |
| DE | 19701090 | | 7/1998 | |

(Continued)

OTHER PUBLICATIONS

Machine translation of CN 101268306 A performed on Mar. 16, 2022, Pritchard (Year: 2008).*

(Continued)

*Primary Examiner* — Brian W Jennison
*Assistant Examiner* — Kevin Guanhua Wen
(74) *Attorney, Agent, or Firm* — KED & ASSOCIATES

(57) ABSTRACT

A steam generator and a cooking apparatus including a steam generator are provided. The steam generator may include a heater, an inflow tube, a steam generation tube, and a discharge tube and an adaptor unit connected to the steam generator may be provided. The inflow tube and the discharge tube and the discharge tube may be connected at a predetermined angle to the adaptor unit. Thus, the steam generation tube connecting the inflow tube to the discharge tube may also be inclined.

13 Claims, 6 Drawing Sheets

(51) Int. Cl.

| | |
|---|---|
| *F22B 37/26* | (2006.01) |
| *F22B 37/08* | (2006.01) |
| *F24C 7/08* | (2006.01) |
| *F24C 15/00* | (2006.01) |
| *F22B 29/02* | (2006.01) |
| *F22B 37/50* | (2006.01) |
| *F22D 5/34* | (2006.01) |
| *F24C 3/12* | (2006.01) |
| *F22B 37/70* | (2006.01) |

(52) U.S. Cl.
CPC .......... *F22B 29/023* (2013.01); *F22B 37/08* (2013.01); *F22B 37/26* (2013.01); *F22B 37/50* (2013.01); *F22B 37/70* (2013.01); *F22D 5/34* (2013.01); *F24C 3/12* (2013.01); *F24C 3/128* (2013.01); *F24C 7/08* (2013.01); *F24C 15/003* (2013.01); *A47J 2027/043* (2013.01)

(56) References Cited

U.S. PATENT DOCUMENTS

| | | | |
|---|---|---|---|
| 2012/0273477 A1 | 11/2012 | Park et al. | |
| 2014/0233928 A1 | 8/2014 | Moughton et al. | |
| 2015/0090706 A1* | 4/2015 | Choi | F24C 15/32 219/401 |
| 2016/0066738 A1* | 3/2016 | Shibuya et al. | A47J 27/04 |
| 2016/0273757 A1 | 9/2016 | Faraldi et al. | |
| 2016/0374499 A1* | 12/2016 | Donarski et al. | A47J 27/04 |

FOREIGN PATENT DOCUMENTS

| | | | | |
|---|---|---|---|---|
| EP | 0886743 B1 | * | 2/2000 | ............ F22B 37/26 |
| EP | 2 896 882 | | 7/2015 | |
| JP | H11-94203 | | 4/1999 | |
| JP | H1194203 A | * | 4/1999 | ............ F22B 1/28 |
| JP | 2010-121803 | | 6/2010 | |
| JP | 2010121803 A | * | 6/2010 | ............ F22B 37/30 |
| JP | 5847153 | | 1/2016 | |
| KR | 10-0784675 | | 12/2007 | |
| KR | 20090125480 A | * | 12/2009 | ............ A47J 27/04 |
| KR | 10-2012-0122141 | | 11/2012 | |
| KR | 10-2016-0097045 | | 8/2016 | |

OTHER PUBLICATIONS

Machine translation of EP 0886743 B1 performed on Mar. 16, 2022, Vollmer (Year: 2000).*
Machine translation of KR 20090125480 A performed on Mar. 16, 2022, Choi (Year: 2009).*
Machine translation of JP H1194203 A, performed on Mar. 16, 2022, Kawamura et al. (Year: 1999).*
Machine translation of JP 2010121803 A performed on Feb. 17, 2023, Inoue et al. (Year: 2010).*
European Search Report dated Sep. 29, 2020 issued in Application No. 18744774.3.
International Search Report (with English Translation) and Written Opinion dated May 14, 2018 issued in Application No. PCT/KR2018/001035.
Korean Notice of Allowance dated Jul. 18, 2019 issued in KR Application No. 10-2017-0012896.

* cited by examiner

STEAM GENERATOR AND COOKING APPARATUS INCLUDING STEAM GENERATOR

CROSS-REFERENCE TO RELATED APPLICATIONS

This application is a U.S. National Stage Application under 35 U.S.C. § 371 of PCT Application No. PCT/KR2018/001035, filed Jan. 23, 2018, which claims priority to Korean Patent Application No. 10-2017-0012896 filed on Jan. 26, 2017, whose entire disclosures are hereby incorporated by reference.

BACKGROUND

1. Field

A steam generator, and a cooking apparatus including a steam generator are disclosed herein.

2. Background

Cooking apparatuses are home appliances that heat an object to be cooked (hereinafter, referred to as a "cooking object") using electricity or gas. When a cooking object is cooked in a cooking apparatus, moisture of the cooking object may be evaporated during heating. Thus, there has been introduced a cooking apparatus having a steam function that supplies steam to the cooking object to prevent the moisture of the cooking object from evaporating and the cooking object dried out. Such a cooking apparatus is provided with a steam generator that generates steam.

A steam generator may include a reservoir tank in which water supplied from an external water supply source is reserved, a heating tube through which the water supplied from the external water supply source flows, and a heating portion or heater that heats the water reserved in the reservoir tank or the water flowing through the heating tube. The steam generator may heat the water supplied from the external water supply source to generate saturated steam, and the saturated steam may be heated again to be supplied to a cooking chamber of the cooking apparatus.

In a related prior art document, EP Publication No. EP 2896882 A1, published on Jul. 22, 2015, and entitled "Steam Generator and Household Appliance", which is hereby incorporated by reference, a disclosed steam generator may have a ' ᆨ ' shape and be installed on a rear surface of an oven to introduce steam into a cavity. However, in the steam generator disclosed in the related prior art document, a vertical length of a tube through which the steam is discharged may be less than a horizontal length of a tube through which water is injected. Thus, when the steam is discharged, water may also be discharged to the cavity deteriorating steam generation efficiency.

Further, in the steam generator disclosed in the related prior art document, as a tube into which water is injected to be heated may have a straight line-shaped structure, residual water may remain to easily generate scale after an operation for generating the steam is stopped. Furthermore, in the steam generator disclosed in the related prior art document, while the steam is continuously or repeatedly generated, as a change in level of injected water and a level of the residual water are unknown, a high water level may occur in the vertical tube. Thus, a Dolby phenomenon in which local heating occurs in the tube may easily occur. Thus, a limitation in which water within the tube is discharged into the cavity may occur.

Herein, the term "scale" refers to material formed when water is heated or cooled in an electric heating appliance. For example, limestone is dissolved in acidic water, which passes through rocks or is permeated, and then dissolved into calcium and acid carbonate ions to cure water. When hard water generated as described above is introduced into the electric heating appliance, the hard water precipitates due to a change in solubility of the calcium and acid carbonate ions to form scale that hardens on an electric heating surface or material, thereby blocking a pipe.

A shape or material of the scale may depend on a content of inorganic material of the water used. For example, the shape or material of the scale may include calcium carbonate, calcium sulfate, barium sulfate, silica, and iron scale, for example.

When the scale is formed, thermal conductivity of the scale vary less than that of a pipe material deteriorating heat transfer performance. Also, a flow rate is reduced due to a fine change in a tube diameter, and a pressure loss through the electric heating appliance increases.

SUMMARY

Embodiments disclosed herein provide a steam generator capable of solving a limitation in which water is discharged together with steam into a cavity when the water is heated, and a cooking apparatus including a steam generator. Embodiments disclosed herein also provide a steam generator capable of solving a limitation in which generation scale increases due to residual water remaining after an operation for generating steam is stopped, and a cooking apparatus including a steam generator.

Embodiments disclosed herein further provide a steam generator capable of solving a limitation in which water is easily discharged into a cavity when a water level within the steam generator is high, and a cooking apparatus including a steam generator. Embodiments disclosed herein also provide a steam generator capable of solving a limitation in which energy efficiency is deteriorated due to water discharged together with steam in the related art, and a cooking apparatus including a steam generator.

In a steam generator according to embodiments disclosed herein and a cooking apparatus including a steam generator, the steam generator may include a heater, an inflow tube, a steam generation tube, and a discharge tube and an adaptor unit connected to the steam generator may be provided. The inflow tube and the discharge tube may be connected at a predetermined angle to the adaptor unit. Thus, the steam generation tube connecting the inflow tube to the discharge tube may also be inclined. Thus, water discharged from the steam generation unit may be collected by the inclination and then be reheated.

Also, in a steam generator according to embodiments disclosed herein and a cooking apparatus including a steam generator, as a collection tube is provided in the adaptor unit, water discharged from the discharge tube may be introduced into the collection tube along an inclination and then collected into a steam generation unit. Thus, the limitation in which the water is discharged together with the steam into the cavity may be prevented.

In a steam generator according to embodiments disclosed herein and a cooking apparatus including a steam generator, an inflow tube of a steam generation unit and an injection tube of an adaptor unit connected to the inflow tube may be disposed to be inclined at a predetermined angle with respect to each other. Thus, as internal residual water is easily drained along an inclination after an operation for generating steam is stopped, generation of scales may be minimized.

In a steam generator according to an embodiment and a cooking apparatus including the same, since a water level sensor is provided in an adaptor unit, when the internal water level is higher than an optimum level, supply of the water may be stopped to prevent the water from easily overflowing to a discharge tube. Also, the optimum water level may be maintained.

In a steam generator according to embodiments and a cooking apparatus including a steam generator, a steam generation unit and an adaptor unit connected to the steam generation unit may be provided. The adaptor unit may include a water drain tube, a collection tube, a steam discharge tube, a first connection tube, and a second connection tube to provide a feedback passage through which condensed water of water or steam, which is discharged from the steam generation unit, is collected to the steam generation unit. Thus, a limitation in which water discharged and discarded to the cavity is wasted in the related art may be solved.

The details of one or more embodiments are set forth in the accompanying drawings and the description. Other features will be apparent from the description and drawings, and from the claims.

DETAILED DESCRIPTION OF THE EMBODIMENTS

Figure 1:
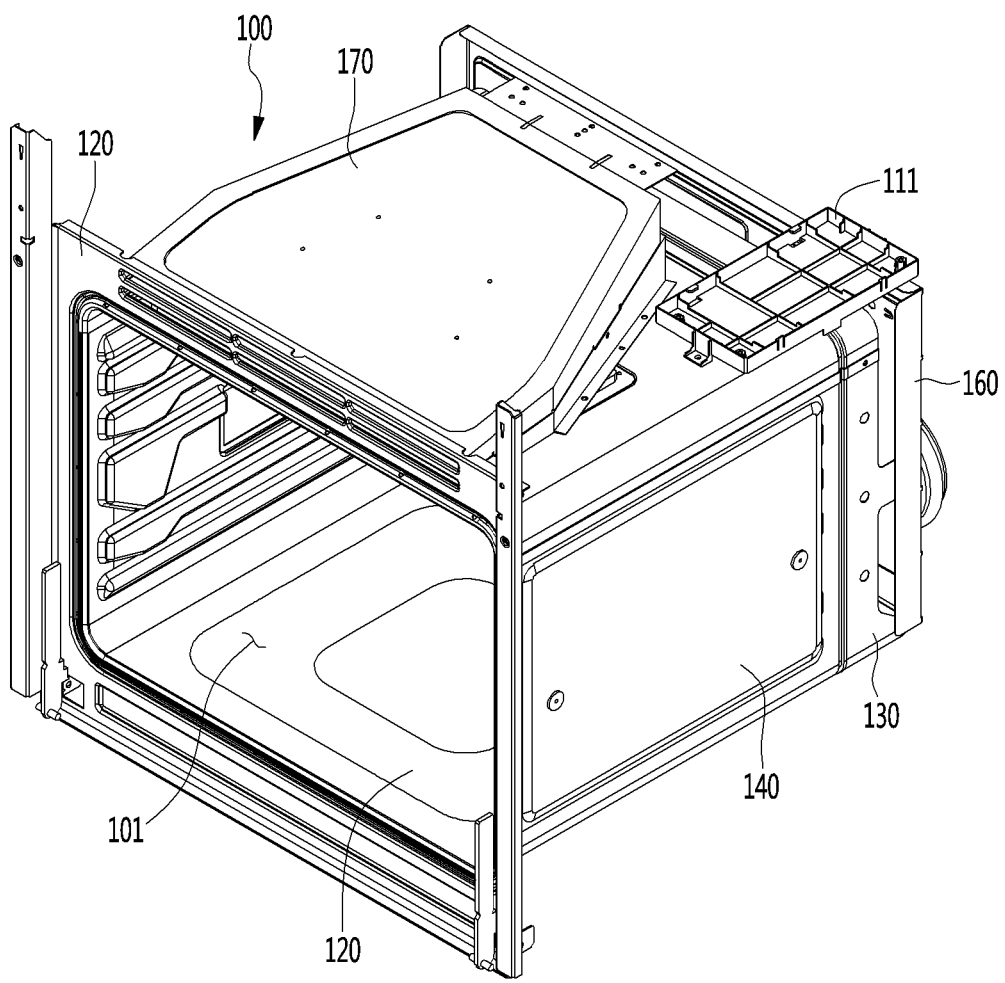
FIG. 1 is a perspective view of a cooking apparatus including a steam generator according to an embodiment.

Hereinafter, embodiments will be described with reference to the accompanying drawings. It should be noted that when components in the drawings are designated by reference numerals, the same or like components may have the same or like reference numerals wherever possible even though the components are illustrated in different drawings. In the following description, a description of known functions and configurations incorporated herein will be omitted to avoid confusion.

In the description of the elements, the terms first, second, A, B, (a), and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
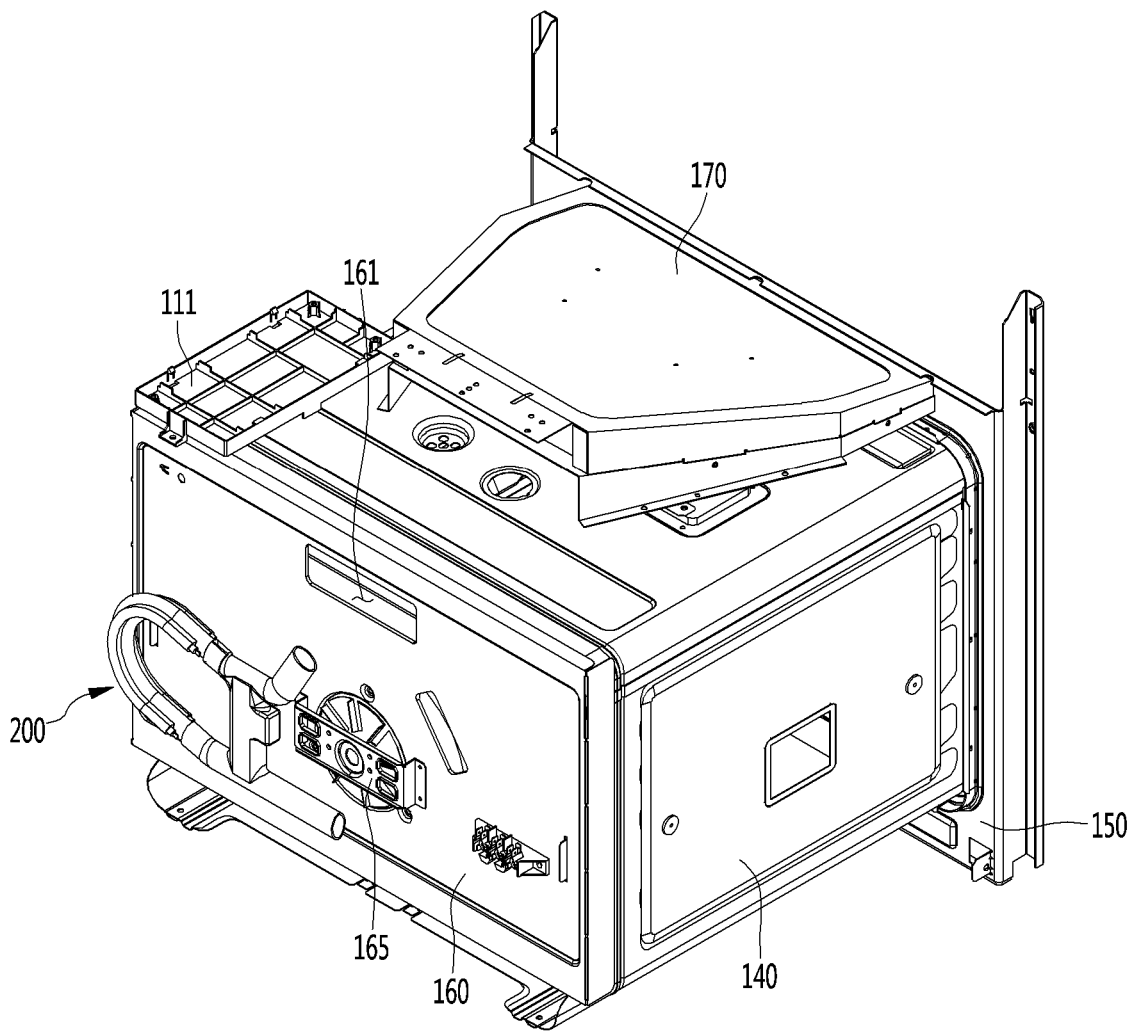
FIG. 2 is a rear perspective view of the cooking apparatus including the steam generator according to an embodiment.
Figure 3:
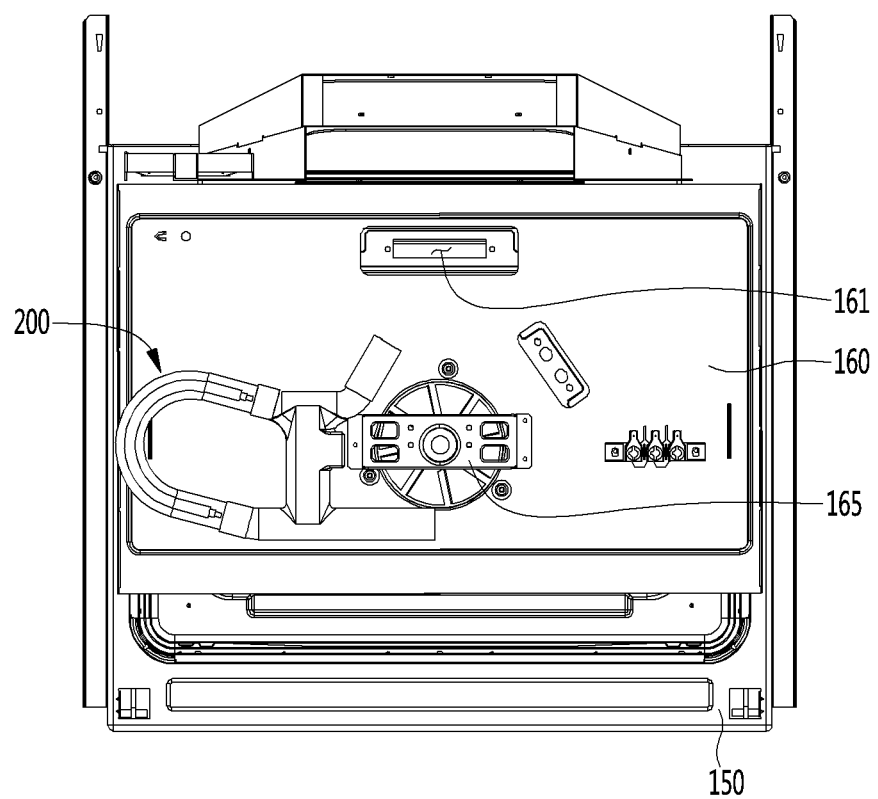
FIG. 3 is a rear view of the cooking apparatus including the steam generator according to an embodiment.

FIG. 1 is a perspective view of a cooking apparatus including a steam generator according to an embodiment, FIG. 2 is a rear perspective view of the cooking apparatus including the steam generator according to an embodiment. FIG. 3 is a rear view of the cooking apparatus including the steam generator according to an embodiment.

Referring to FIGS. 1 to 3, a cooking apparatus according to an embodiment may include a cavity 100. A cooking chamber 101 may be provided within the cavity 100. The cooking chamber 101 may provide a space for cooking foods or other items (hereinafter, collectively "food").

The cavity 100 may include an upper plate 110, a bottom plate 120, a rear plate 130, and side plates 140. The upper plate 110 and the bottom plate 120 may define a top surface and a bottom surface of the cavity 100, respectively. The rear plate 130 may define a rear surface of the cavity 100, and the side plates 140 may define both side surfaces of the cavity 100.

The cooking apparatus may further include an outer case (not shown) and a door (not shown) that surrounds the upper plate 110 and the side plates 140. The outer case may have a longitudinal cross-section with an approximately ⊏ shape. For example, the cavity 100 may have a polyhedral shape with an open front surface.

Each of the bottom plate 120, the rear plate 130, the upper plate 110, and the side plates 140 may have a rectangular shape. However, embodiments are not limited to only the rectangular shape.

The upper plate 110 and the bottom plate 120 may define a ceiling and a bottom surface of the cooking chamber 101, respectively. The rear plate 130 and the side plates 140 may define a rear surface and both side surfaces of the cooking chamber 101.

An irradiation opening (not shown) and a porous portion (not shown) may be defined in the upper plate 110. The irradiation opening may be understood as an inlet through which microwaves generated in or by a magnetron (not shown) are irradiated into the cooking chamber 101. Also, the porous portion may be understood as a portion through which energy, that is, light and heat of a halogen (not shown) may be transmitted to an inside of the cooking chamber 101.

A plurality of suction holes (not shown) and discharge holes (not shown) may be defined in the rear plate 130. The plurality of suction hole may be understood as holes through which air may be suctioned from the inside of the cooking chamber 101 into a convection chamber (not shown) which will be described hereinafter. The discharge holes may be understood as a hole through which air may be discharged from an inside of the convection chamber into the cooking chamber 101. That is, the cooking chamber 101 and the convection chamber may substantially communicate with each other through the suction hole and the discharge holes.

A plurality of cooking chamber exhaust holes (not shown) may be defined in one or a first side plate of the side plates 140. The cooking chamber exhaust holes may be understood as outlets through which the air supplied to the inside of the cooking chamber 101 together with the microwaves through the irradiation opening may be discharged outside of the cooking chamber 101. A steam injection hole (not shown) may be defined in the other or a second side plate of the side plates 140. The steam injection holes may be understood as holes through which steam generated in the steam generator 200 may be supplied to the inside of the cooking chamber 101.

The defined position of the steam injection holes is not limited to the side plates 140. For example, the steam injection holes may be defined in the rear plate 130 so that the steam generated in the steam generator 200 may be discharged into the cooking chamber 101 through the steam injection holes of the rear plate by passing through a back plate 160 which will be described hereinafter.

The cavity 100 may further include a front plate 150 and the back plate 160, which may be respectively disposed on front and rear ends of the cavity 100. A rear surface of the front plate 150 may be installed to be fixed to front ends of the upper plate 110, the bottom plate 120, and the side plates 140. Also, a front surface of the back plate 160 may be installed to be a portion of a rear surface of the rear plate 130.

The back plate 160 may have a rectangular shape. For example, an edge of a lower end of the back plate 160 may be parallel to an edge of a lower end of the rear plate 130.

The back plate 160 may include a communication opening 161 defined at an upper end thereof. The communication opening 161 may allow an upper portion of the cavity 100 to communicate with an electric room (not shown). The electric room may be defined at a rear surface of the back plate 160.

The cooking apparatus may further include a cooling fan capable of cooling the magnetron, a high-voltage transformer, a halogen heater, and the electric room. That is, the electric room may provide a space in which the cooling fan that cools a plurality of electronic components, such as the magnetron, and the high-voltage transformer, for example.

The magnetron (not shown) may oscillate microwaves irradiated into the cooking chamber 101. The high voltage transformer (not shown) may apply high voltage current to the magnetron.

The cooking apparatus may further include a waveguide (not shown). The waveguide may direct microwaves oscillated from the magnetron to the inside of the cooking chamber 101. As a result, the cavity 100 may further include a waveguide installation portion 111 on which the waveguide may be installed. The waveguide installation portion 111 may be disposed on a top surface of the cavity 100, that is, the upper plate 110. Thus, the waveguide may be disposed on the top surface of the cavity 100.

The halogen heater may provide light and heat to the inside of the cooking chamber 101 through the porous portion. The halogen heater may be covered by a reflector (not shown) and an upper cover 170.

That is, the cavity 100 may further include the upper cover 170. The upper cover 170 may be disposed above the upper plate 110. A lamp to light the inside of the cooking chamber 101 may be installed on the upper plate 110. Thus, the upper cover 170 may cover the lamp.

The cooling fan may generate a flow of air that circulates through the inside of the cooking chamber 101. For example, the cooling fan may include two fans and one fan motor that drives the fans. The fan may include a sirocco fan that suctions air in an axial direction to discharge the air in a circumferential direction.

An upper heater (not shown) may be installed at upper portion of the cooking chamber 101. The upper heater may provide heat that radiation-heats the cooking object in the cooking chamber 101. A sheath heater may be used as the upper heater.

Also, although not shown, the cavity may further include the convention chamber. A convection heater and a convection fan may be provided in the convection chamber.

The convection heater may provide heat that convection-heats the cooking object in the cooking chamber 101. The convection fan may generate a flow of air that circulates through the cooking chamber 101 and the convection chamber. When the convection fan is driven, air may pass through the suction holes and the discharge holes to circulate through the cooking chamber 101 and the convection chamber. Thus, the heat of the convection heater may be convected to the cooking chamber 101 by the convection fan.

The cavity 100 may further include a convection motor that provides a drive force that drives the convection fan. The convection motor may be disposed in the electric room. Also, the convection motor may be installed to be fixed by a convection motor installation portion 165 disposed on the rear surface of the back plate 160.

The cooking apparatus may further include a steam generator 200 that generates steam to be supplied to the cooking chamber 101. The steam generator 200 may heat supplied water to generate steam and provide the steam to the cooking chamber 101. In the steam generator 200, liquid water, saturated steam, and superheated steam may be mixed together depending on a heated state of the water.

As described above, the electric room may be defined at the rear surface of the back plate 160. The steam generator 200 may be installed in the electric room. The steam generator 200 may be installed on the rear surface of the back plate 160.

However, the installed position of the steam generator 200 is not limited to the back plate 160. For example, the steam generator 200 may be installed on the side plate 140.

The bottom plate 120 and a lower end of the rear plate 130, which may define a bottom surface of the cooking chamber 101, may be parallel to a support surface of the, ground or furniture, on which the cooking apparatus is placed, so that the cooking chamber 101 may be disposed horizontally. That is, a lower end of the back plate 160 may be disposed in a direction perpendicular to a direction of gravity acting on the cavity 100.

When the steam generator 200 is installed in the electric room or on the back plate 160, an installed direction in which a water supply and drain tube 410 of the steam generator 200 is installed may not be limited thereto. However, when considering supply and drain of water to and from the steam generator 200, a function of the collection tube 440, which will be described hereinafter, and an optimum effect due to the inclination, the water supply and drain tube 410 may be installed parallel to an edge defined by the lower end of the back plate 160.

The cooking apparatus may further include a water supply tank. The water supply tank may store water supplied to the steam generator 200. The water supply tank may be connected to a pump (not shown) so that the water is supplied to the steam generator 200. For example, the pump may be disposed below the bottom plate 120. The pump may be understood as a component that pumps the water stored in the water supply tank to the steam generator 200.

The cooking apparatus may further include a drain pump (not shown) connected to the steam generator 200 to drain residual water remaining after generating the steam by the steam generator 200 and a drain tank (not shown) that accommodates and storing the drained water. The water supply tank and the water drain tank may be connected to the water supply and drain tube 410 which will be described hereinafter. A valve that is switched to selectively form a passage with one of the water supply tank or the water drain tank may be provided in the water supply and drain tube 410. Thus, the water may be supplied to the steam generator 200 through the water supply and drain tube 410, and residual water of the stream generator 200 may be drained to the drain tank.

The valve may allow an injection tube to be connected to one of the water supply tank or the drain device by a switching operation thereof. For example, a plurality of the valve may be provided The valve may include a first valve provided in a passage through which the water supply and drain valve 410 and the water supply tank are connected to each other and a second valve provided in a passage through which the water supply and drain tube 410 and the drain tank are connected to each other. When the water is introduced into the steam generator 200, the first valve may be opened, and the second valve may be closed. Also, when the operation of the steam generator 200 is stopped, the first valve may be closed, and the second valve may be opened.

The valve may be switched by being interlocked or in communication with the water level sensor which will be described hereinafter. For example, the valve of the passage connected to the water supply tank may be closed according to water level information detected by the water level sensor to stop the supply of the water to the steam generation unit 300.

Hereinafter, steam generator 200 according to an embodiment will be described.

Figure 4:
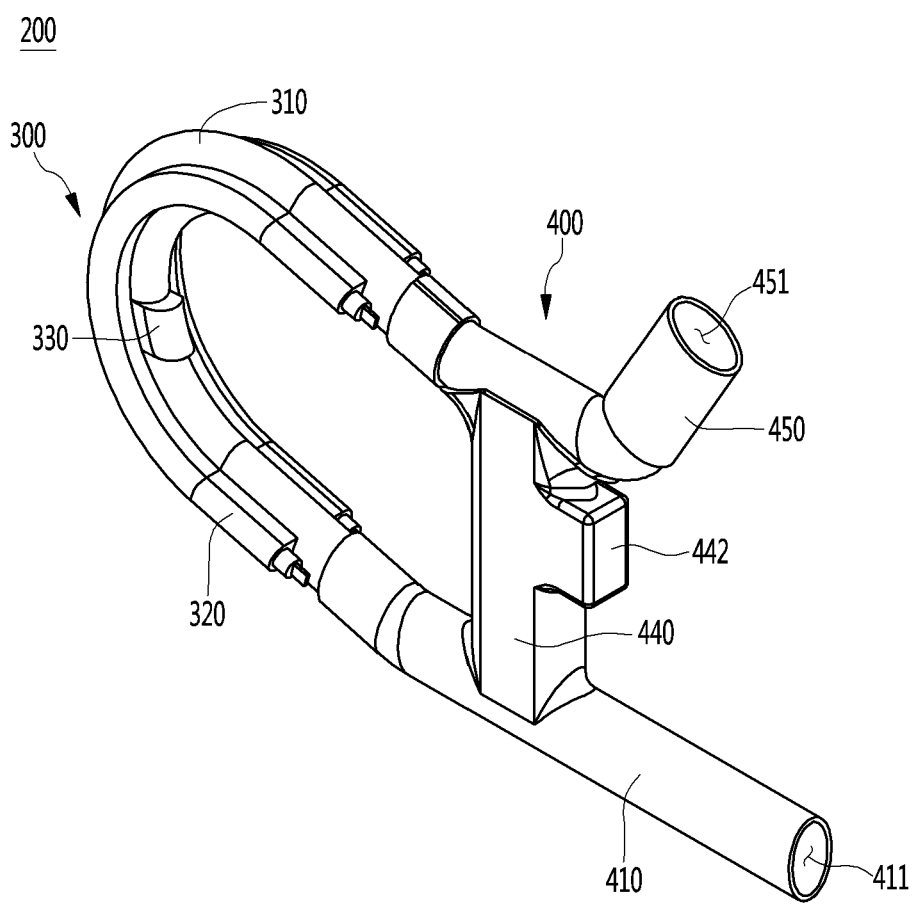
FIG. 4 is a perspective view of the steam generator according to an embodiment.
Figure 5:
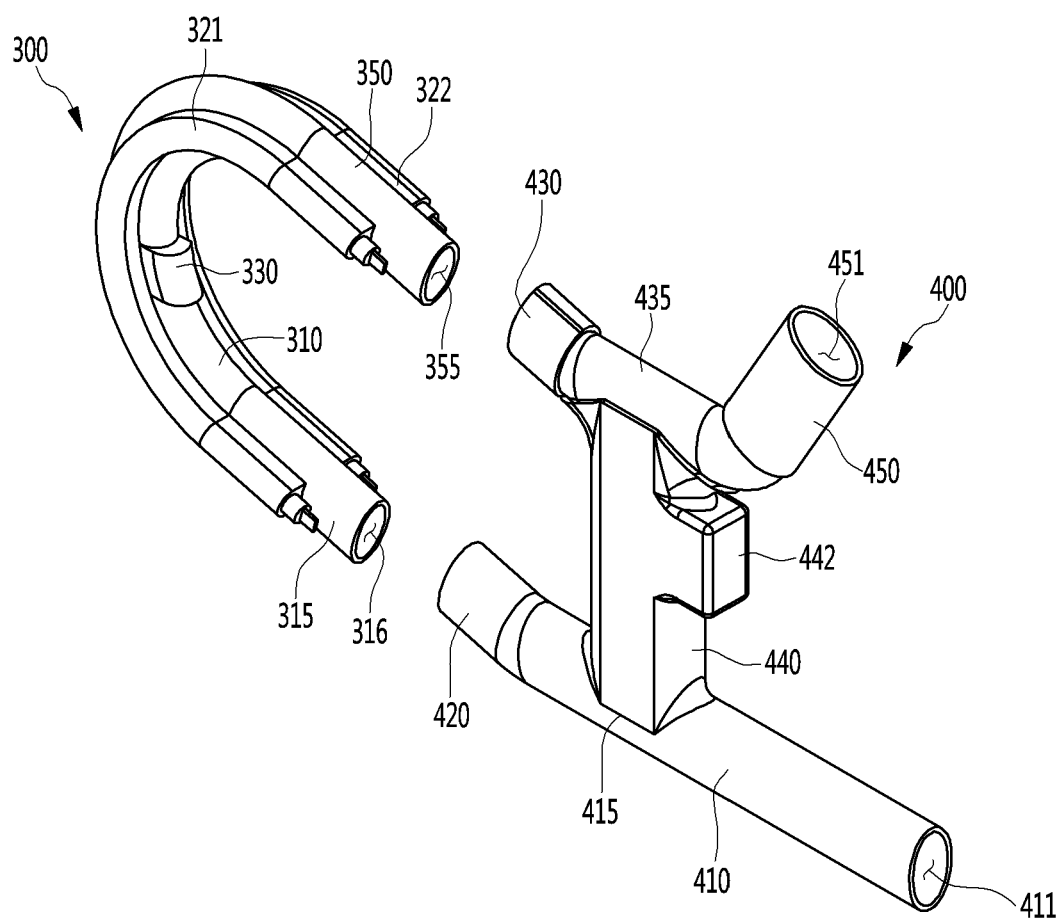
FIG. 5 is an exploded perspective view illustrating components of the steam generator according to an embodiment.

FIG. 4 is a perspective view of the steam generator according to an embodiment. FIG. 5 is an exploded perspective view illustrating components of the steam generator according to an embodiment.

Referring to FIGS. 4 and 5, the steam generator 200 may include a steam generation unit 300 and an adaptor unit 400 connected to the steam generation unit 300. The adaptor unit 400 may be connected to the water supply tank to supply water to the steam generation unit 300. Also, the adaptor limit 400 may be branched into passages so as to divide the steam and the water, discharged from the steam generation unit 300. Thus, the steam may flow to the cooking chamber 101, and the water may be collected to be supplied again to the steam generation unit 300 through the adaptor unit 400.

The steam generation unit 300 may include an inflow tube 315 that accommodates water, a steam generation tube 310 connected to the inflow tube 315, a discharge tube 350 connected to the steam generation tube 310, and a heater 320 providing heat. The heater 320 may protrude along an extension direction on outer surfaces of the inflow tube 315, the steam generation tube 310, and the discharge tube 350. The heater 320 may transfer heat to the inflow tube 315, the steam generation tube 310, and the discharge tube 350. Thus, accommodated in portions of the inflow tube 315 and the steam generation tube 310 may be heated to generate saturated steam, and the saturated steam may be heated while flowing along the steam generation tube 310 and the discharge tube 350 to generate overheated steam.

The heater 320 may be, for example, welded to the outer surfaces of the inflow tube 315, the steam generation tube 310, and the discharge tube 350. Thus, the heater 320 may transfer heat to the steam generation unit 300 through surface-contact. Alternatively, the heater 320 may be fixed in various manners in which the heat of the heater 320 is transferred to the steam generation unit 300.

The inflow tube 315, the steam generation tube 310, and the discharge tube 350 may be referred to as a heating tube. That is, the heater 320 may provide heat to the heating tube.

A plurality of the heater 320 may be provided. For example, the heater 320 may include a first heater 321 and a second heater 322 disposed symmetrical to the first heater 321.

The first heater 321 may protrude from an outer surface of the heating tube in one direction to extend in an extension direction of the heating tube. The second heater 322 may be disposed symmetrical to the first heater 321 with respect to the heating tube. As a result, as the heating tube is dual heat-transferred by the first heater 321 and the second heater 322, heating of the water may be performed more quickly.

The heating tube may have an inflow hole 316 through which supplied water may be injected and a discharge hole 355 through which steam may be discharged at both ends thereof, respectively, and may extend from the inflow hole 316 to the discharge hole 355 at a curvature within a predetermined range. For example, the heating tube may be bent so that the discharge hole 355 and the inflow hole 316 face a same direction. That is, the discharge hole 355 and the inflow hole 316 may be spaced a predetermined distance from each other so as to be parallel to each other. More particularly, the heating tube may have an inclined 'U' shape. Also, the heating tube may be connected to the adaptor unit 400 at a predetermined inclination. In one embodiment, the heating tube may be bent to extend so to be symmetrical in both directions with respect to a central point $O_2$. This will be described later hereinafter.

The inflow tube 315 and the steam generation tube 310 may be understood as spaces in which water is heated by heat transfer of the heater 320 and thus changed in phase. The steam generation tube 310 may have a hollow tube having a shape in which a 'U' shape which is a horseshoe shape is inclined at an angle of about 90 degrees to about 120 degrees. However, the steam generation tube 310 is not limited to the U shape and may have an asymmetric curvature and length. In this embodiment, the steam generation tube 310 having the symmetrical curvature and length will be described for convenience of explanation.

The inflow tube 315 through which the water may be introduced and the discharge tube 350 through which heated steam may be supplied to the cooking chamber 101 may be disposed on both ends of the steam generation tube 310. That is, the steam generation tube 310 may have one or a first end connected to the inflow tube 315 and the other or a second end connected to the discharge tube 350. The inflow tube 315 may be connected to a lower end of the steam generation tube 310, and the discharge tube 350 may be connected to an upper end of the steam generation tube 310.

Each of the inflow tube 315 and the discharge tube 350 may be provided as a straight line-shaped hollow tube. For example, the inflow tube 315 and the discharge tube 350 may be disposed to parallel to each other. The inflow hole 316 defined by one end of the inflow tube 315 and the discharge hole 355 defined by one end of the discharge tube 350 may face the same direction.

The inflow tube 315 may be connected to an external water supply source, that is, the water supply tank and then connected to the water supply and drain tube 410 that accommodates the water. This will be described hereinafter. Alternatively, the inflow tube 350 may be directly connected to the water supply tank.

The discharge tube 350 may be connected to the steam discharge tube 450 to provide a passage so that the steam is supplied to the cooking chamber 101. That is, the discharge tube 350 may communicate with the cooking chamber 101.

The heated water within the steam generation tube 310 may generate steam. The discharge tube 350 may provide a passage through which the steam may flow to the adaptor unit 400. Liquid water contained in the steam generation tube 310 may be introduced into the discharge tube 350 by the Dolby phenomenon due to local overheating of the steam generation tube 310 and be discharged to the adaptor unit 400. That is, the steam and/or water may be discharged to the adaptor unit 400 through the discharge tube 350.

The steam generation unit 300 may further include a temperature sensor 330 that detects a temperature. The temperature sensor 330 may be installed at one side of the steam generation tube 310. The temperature sensor 330 may operate by being interlocked or in communication with the heater 320. The temperature sensor 330 may be controlled so that the operation of the heater 320 may be stopped when the temperature of the steam generation tube 310 is detected at a temperature greater than a preset or predetermined temperature.

The adaptor unit 400 may include a water supply and drain tube 410 into which water may be introduced, a first connection tube 420 connected to the water supply and drain tube 410 to provide a passage through which water may be supplied to the steam generation unit 300, a second connection tube 430 connected to the discharge tube 350 to provide a passage through which steam and water discharged from the discharge tube 350 may flow, a branch 435 connected to the second connection tube 430, a collection tube 440 connected to the branch tube 435 to provide a passage through which water discharged from the discharge tube 350 may be collected into the water supply and drain tube 410, and a steam discharge tube 450 connected to the branch part 435 to provide a passage through which the steam may flow.

The water supply and drain tube 410 may be connected to the water supply tank to accommodate water. The water supply and drain tube 410 may be connected to the first connection tube 420. Thus, the water may flow to the steam generation unit 300 through the first connection tube 420.

The water supply and drain tube 410 may be a hollow tube. The water supply and drain tube 410 may accommodate the water through a water supply and drain hole 411 which is an opening defined at one or a first end thereof. The other or a second end of the water supply and drain tube 410 may be connected to the first connection tube 420. The water supply and drain tube 410 may be connected to the first connection tube 420 at a predetermined angle. This will be described hereinafter.

The water supply and drain tube 410 may be connected to the drain tank to drain residual water remaining in the steam generation unit 300. The water supply and drain tube 410 may be understood as a drain passage through which residual water may be drained. Thus, the residual water may flow to the drain tank through the water supply and drain hole 411.

When water is supplied to the steam generation unit 300, the valve installed in the passage connecting the water supply and drain tube 410 to the water supply tank may be opened, and the valve installed in the passage connecting the water supply and drain tube 410 to the drain tank may be closed. When the residual water is drained, switching operations of the valves may be reversed.

The water supply and drain tube 410 may provide a combination portion 415 which is an opening connected to the collection tube 440. That is, the combination portion 415 may be understood as a point or points at which the collection tube 440 is connected. The combination portion 415 may allow liquid water flowing through the collection tube 440 to be mixed with water flowing through the water supply and drain tube 410 so that the mixture is introduced again to the steam generation unit 300.

The first connection tube 420 may connect the water supply and drain tube 420 to the inflow tube 315. The first connection tube 420 may have one or a first end connected to the water supply and drain tube 420 and the other or a second end connected to the inflow tube 315. Thus, the water introduced into the water supply and drain tube 420 may be introduced into the steam generation tube 310 through the inflow tube 315. The first connection tube 420 may be provided as a hollow tube.

The second connection tube 430 may have one or a first end connected to the discharge tube 350 and the other or a second end connected to the branch portion 435. The second connection tube 430 may be provided as a hollow tube. The second connection tube 430 may provide a passage for steam and/or liquid water discharged from the discharge tube 350 to flow to the branch tube 435.

The branch tube 435 may be connected to the second connection tube 430 at a predetermined inclination. The steam and water flowing from the second connection tube 430 may be divided into the passages.

The branch tube 435 may be connected to the second connection tube 430, the steam discharge tube 450 through which the steam flows, and the collection tube 440 through which the water discharged from the discharge tube 350 flows.

Each of the steam discharge tube 450 and the collection tube 440 may be provided as a hollow tube.

The steam discharge tube 450 may be connected to the branch tube 435 at a predetermined inclination. The collection tube 440 may be connected to the branch tube 435 at a position between the steam discharge tube 450 and the second connection tube 430.

The collection tube 440 may be connected to a lower side of the branch tube 435 to extend downward. The collection tube 440 may have one or a first end connected to a lower side of the branch tube 435 and the other or a second end connected to the combination portion 415.

The branch portion 435 and the combination portion 415 may be spaced apart from each other in opposite directions. For example, a virtual perpendicular line drawn from a center of the branch tube 435 may contact a center of the combination portion 415. That is, the collection tube 440 may be positioned along the perpendicular line.

The steam may flow to the steam discharge tube 450 communicating with the cooking chamber 101 due to a pressure difference. The water discharged from the discharge tube 350 may flow to the collection tube 440 connected to the water supply and drain tube 410 by gravity.

An opening defined by one or a first end of the steam discharge tube 450 may be referred to as a steam discharge hole 451. The steam discharge hole 451 may be disposed to face an upper side. The steam may flow toward the cooking chamber 101 through the steam discharge hole 451.

The steam may flow through the second connection tube 430, the branch tube 435, and the steam discharge tube 450 to generate condensed water due to a condensation phenomenon caused by a temperature change. In the steam generator according to the related art, there is a limitation in that the condensed water as described above is discharged into the cavity. On the other hand, the steam generator 200 according to embodiments may be connected to the branch tube 435 so that the steam discharge tube 450 has a predetermined inclination so that, even if condensed water is generated, the condensed water drops down by gravity so as to be introduced into the collection tube 440.

That is, the collection tube 440 may provide a passage through which the water and condensed water discharged from the discharge tube 350 may be introduced to the water supply and drain tube 410. The water and the condensed water discharged from the discharge tube 350 may be referred to as discharge water.

The discharge water may be joined to the water flowing in the water supply tube 410 through the collection tube 440 and may be introduced again into the steam generation unit 300. The re-introduced discharge water may be reheated by the heater 320 to generate steam. As a result, steam generation efficiency, which is defined as the generated steam relative to an amount of the injected water, may be improved compared to the related art.

When the water supply tube 410 is connected to the discharge tank, the drain water may be drained together with residual water along the water supply and drain tube 410.

The adaptor unit 400 may further include a water level sensor 442 that detects a water level. The water level sensor 442 may be installed at one side of the collection tube 440.

The installed position of the water level sensor 442 is not limited to the collection tube 440. For example, the water level sensor 442 may be installed on the steam generation tube 310. Also, a plurality of the water level sensor 442 may be provided.

When a use time of the steam generator 200 increases, water collected into the collection tube 440 and water flowing through the water supply and drain tube 410 and introduced into the steam generation unit 300 may be filled up to a height corresponding to one point of the steam generator 310 and the collection tube 440. As the level of the water filled into the steam generation tube 310 and the collection tube 440 is above an optimum level (a high level), an amount of water passing through the discharge tube 350 may increase. Also, as the water level within the collection tube 440 is too high, the water together with the steam may flow toward the steam discharge hole 451 to the steam injection hole. Also, an occurrence frequency of the Dolby phenomenon may increase due to the high level. That is, a loss of water may occur.

The water level sensor 442 may detect the level of water in the collection tube 440 to adjust an amount of water of the steam generator 200. Information detected by the water level sensor 442 and switching operation of the valve may be interlocked with each other. For example, when the water level of the collection tube 440 is above a predetermined optimum level, the supply of the water introduced from the water supply tank may be stopped. The steam generator 200 may perform a drain operation to reduce the internal water level to a predetermined level even in a state in which the steam generator 200 continuously generates steam through the switching operation of the valve. The water level sensor 442 may be an electroconductive type, a capacitive type, a differential pressure type, or a float type water level sensor, for example.

In summary, the water level sensor 442 may detect an amount of injected water and an amount of water collected into the collection tube 440. Further, when operation of the steam generator 200 is stopped, the water level sensor 442 may detect a level of residual water remaining in the steam generator 200. Furthermore, an amount of injected water may be detected by the water level sensor 442.

A controller (not shown) may adjust the water injected into the steam generator 200 to an optimal amount using water level information detected by the water level sensor 442. That is, the water level within the steam generator 200 may be optimally maintained. Thus, the water level sensor 442 may prevent the water from being introduced into the steam generator 310 at a level above the optimum level and thus solve the above-described limitation in the related art.

Figure 6:
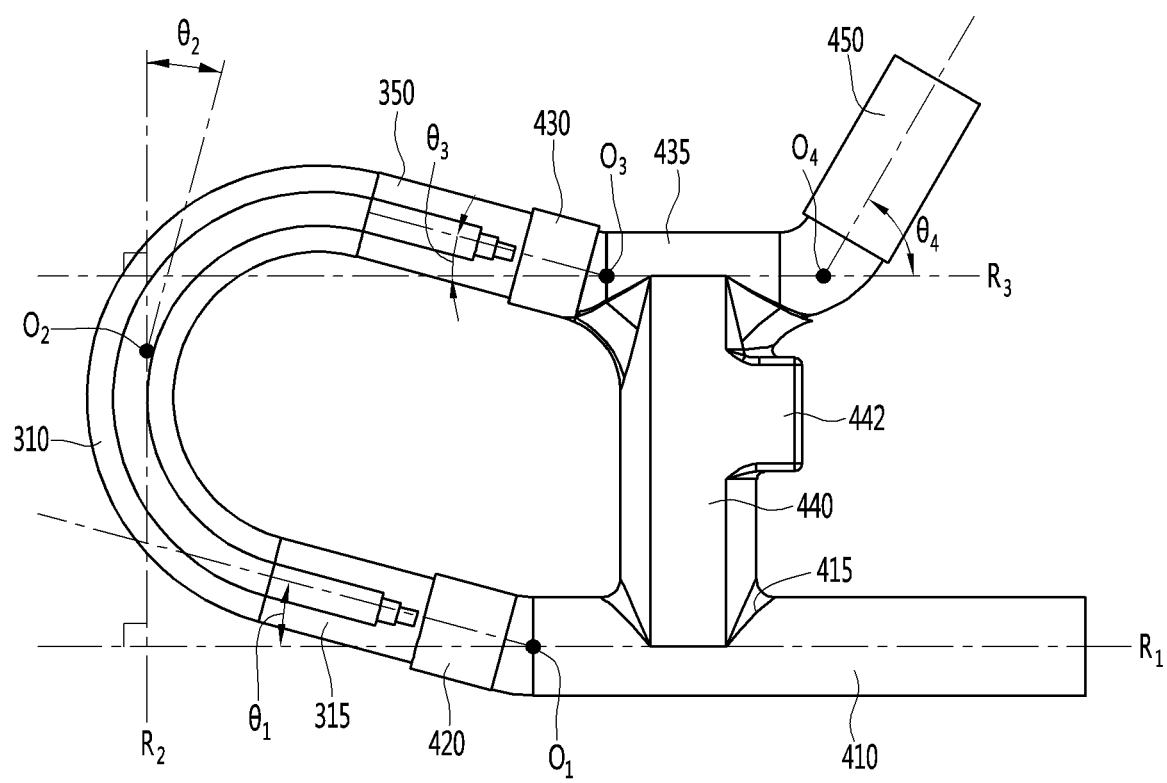
FIG. 6 is a view illustrating an arrangement relationship between components of the steam generator according to an embodiment.

FIG. 6 is a view illustrating an arrangement relationship between components of the steam generator according to an embodiment. A connection and position relationship between the steam generation unit 300 and the adaptor unit 400 will be described with reference to FIG. 6.

Referring to FIG. 6, a virtual line extending along a central axis of the water supply and drain tube 410 may be defined as a first reference line $R_1$. The first reference line $R_1$ may be a horizontal line. For example, as described above, when the water supply tube 410 is installed to be parallel to the lower end of the back plate 160, the first reference line $R_1$ may be parallel to the lower end of the back plate 160.

The water supply tube 410 may be connected to the first connection tube 420 at a predetermined inclination upward. The water supply tube 410 may be connected to the first connection tube 420 at a first angle $\theta_1$. The first angle $\theta_1$ may be set to about 15° to about 30°. That is, an angle between a central axis of the first connection tube 420 and the first reference line $R_1$ is the first angle $\theta_1$. A point at which the center axis of the first connection tube 420 and a center axis of the water supply and drain tube 410 meet each other is defined as a first reference point $O_1$.

As described above, the first connection tube 420 may be connected to the inflow tube 315 provided as a straight line-shaped tube. Thus, an angle between the inflow tube 315 and the water supply and drain tube 410 is equal to the first angle $\theta_1$.

As the first connection tube 420 is connected to the inflow tube 315 at the first angle $\theta_1$ from the first reference line R1 and the inflow tube 315, when the residual water of the steam generation unit 300 is easily drained after stopping operation of the steam generator 200 by self-weight thereof. Thus, as the steam generator 200 according to embodiments easily removes residual water, there is an advantage that scale generation due to residual water may be minimized.

The inflow tube 315 may be connected to the steam generation tube 310. The steam generation tube 310 having a shape bent in a U shape may be disposed so that a front surface of the opening defined in each of both ends has a predetermined inclination with respect to the water supply and drain tube 410. For example, the opening of one or a first end of the steam generation tube 310 connected to the inflow tube 315 may be disposed to define the first angle $\theta_1$ with the first reference line $R_1$. Similarly, the opening of the other or a second end of the steam generation tube 410 connected to the discharge tube 350 may be disposed to define a third angle $\theta_3$ with a third reference line $R_3$, which will be described hereinafter. Thus, according to embodiments, the steam generation tube 310 may be connected to the inflow tube 315 and the discharge tube 350 by being inclined by an angle of about 105° to about 120°.

A central point of the steam generation tube 310 may be defined as a second reference point $O_2$. A straight line perpendicular to the first reference line $R_1$ and passing through the second reference point $O_2$ is defined as a second reference line $R_2$. The second reference line $R_2$ is perpendicular to the third reference line $R_3$.

The third reference line $R_3$ is defined as a straight line extending perpendicular to the second reference line $R_2$ and extending along a central axis of the branch tube 435. The third reference line $R_3$ is parallel to the first reference line $R_1$.

An upper portion of the steam generation tube 310 may be inclined at a predetermined angle from the second reference line $R_2$. The predetermined inclination is defined as a second angle $\theta_2$. The second angle $\theta_2$ may be set to about 15° to about 30°. Also, the upper portion of the steam generation tube 310 may be understood as an upper portion of the second reference point $O_2$.

In summary, the steam generation tube 310 may be provided so that the bent portion disposed at the upper side of the second reference point $O_2$ has a second angle $\theta_2$ from the second reference line $R_2$. Referring to the effect of the self-weight of the steam generation unit 300, as the upper bent portion of the steam generation unit 300 starts along substantially the second angle $\theta_2$, the steam may be collected again into the water accommodated at a predetermined level within the tube by the self-weight even though the water existing in the steam generation tube 310 is bounded due to the Dolby phenomenon, for example, in a liquid state. Thus, the discharged water may be collected and reheated in the steam generator 200 according to embodiments to improve steam generation efficiency.

The discharge tube 350 connecting the steam generation tube 310 and the second connection tube 430 may have a predetermined inclination with respect to the third reference line $R_3$. The discharge tube 350 may be provided as a straight line-shaped tube and connected to the second connection tube 430 to provide a passage through which the steam may flow. The second connection tube 430 may be connected to the branch tube 435 at a predetermined inclination (the third angle). The discharge tube 350 connected to the second connection tube 430 may be connected to the branch tube 435 so as to have the same inclination (the third angle).

The third reference line $R_3$ may extend perpendicular to the second reference line $R_2$ with an extension line passing through the center axis of the branch tube 435. A point at which the third reference line $R_3$ meets an extension line of a central axis of the second connection tube 420 is defined as a third reference point $O_3$.

An angle between the third reference line $R_3$ and a center axis of the second connection tube 430 is defined as a third angle $\theta_3$. The third angle $\theta_3$ may be set to about 15° to about 30°. That is, an angle between the central axis of the second connection tube 430 and the third reference line $R_3$ is the third angle $\theta_3$. Also, the second connection tube 430 may be connected at the third angle $\theta_3$ upward from the branch tube 435.

As the second connection tube 430 is inclined at the third angle $\theta_3$ with respect to the branch tube 435 and the discharge tube 350, even though the water above the water level of the supplied water passes through the bent portion of the steam generation tube 310 to overflow due to the Dolby phenomenon, for example, the water may be guided to be introduced into the collection tube 440 by the self-weight.

As the discharge tube 350 and the second connection tube 430 provide a passage having an inclination corresponding to the third angle $\theta_3$, the water discharged from the steam generation tube 310 may be easily introduced into the collection tube 440. Thus, the steam generator 200 according to embodiments may have a feedback structure in which water discharged from the discharge tube 350 may be easily introduced into the collection tube 440 and mixed with water flowing through the water supply and drain tube 410 so as to be reheated, thereby improving steam generation efficiency.

The steam discharge tube 450 may be connected to the branch tube 435 at a predetermined inclination. The steam discharge tube 450 may be connected to the branch part 435 to have a predetermined inclination upward. The predetermined inclination is defined as a fourth angle $\theta_4$.

The fourth angle $\theta_4$ may be understood as an angle defined by the third reference line $R_3$ and a center axis of the steam discharge tube 450. The fourth angle $\theta_4$ may be set to about 15° to about 90°. A point at which the center axis of the steam discharge tube 450 meets the third reference line $R_3$ is defined as a fourth reference point $O_4$.

The steam discharge tube 450 may be connected to the branch tube 435 at the fourth angle $\theta_4$. Thus, steam discharged from the discharge tube 350 may be introduced into the collection tube 440 along the inclination of the steam discharge tube 450 by self-weight even though condensed water is generated by a phase change due to a condensation phenomenon in the steam discharge tube 450. Also, the condensed water may be mixed with the water supplied through the collection tube 440 to achieve reheating, thereby improving steam generation efficiency. Thus, the steam generator 200 according to embodiments may solve the limitation in the related art in which steam generation efficiency is deteriorated because condensed water generated from the steam is directed to the cavity.

Each of the plurality of tubes 410, 420, 430, 435, 440, and 450 of the adaptor unit 400 may be made of a silicon material.

For more clear description of the steam generator 200 according to embodiments, a reference of direction will be described. A longitudinal direction of the collection tube 440, that is, an extension direction of the collection tube 440 connected to the branch tube 435 and the combination portion 415 may be understood as a vertical direction or a horizontal direction.

According to embodiments disclosed herein, water discharged from the steam generation unit may be collected to be reheated, thereby reducing loss of the water injected to generate steam. That is, steam generation efficiency may be improved.

Further, according to embodiments disclosed herein, as residual water is easily removed from the steam generation unit in which the heater is provided, generation of scales may be minimized. Thus, pressure loss due to fine changes in tube diameter may be reduced. Also, generation of scales may be minimized to improve the manageability and a lifespan of the steam generator.

Furthermore, according to embodiments disclosed herein, as an optimum level is maintained through the water level within the steam generator by using the water level sensor, generation of the Dolby phenomenon may be relatively reduced when compared to the related art. Thus, as the steam generator having a high efficiency is provided in the cooking apparatus, the reliability of the cooking apparatus may be improved.

Also, according to embodiments disclosed herein, as the water is reheated through the feedback structure even though the water is not discharged in the form of steam but discharged, energy waste may be reduced. Thus, energy efficiency may be improved.

Additionally, according to embodiments disclosed herein, as the inside of the steam generation unit is heated while maintaining the optimum water level, the steam generation rate may be improved to generate high-energy steam.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A steam generator, comprising:
   at least one u-shaped heater configured to provide heat;
   an inclined u-shaped heating tube configured to generate steam by receiving the heat from the at least one u-shaped heater, wherein the at least on u-shaped heater corresponds in shape to the inclined u-shaped heating tube and extends along an outer surface along a length thereof;
   a water supply and drain tube configured to receive water into the steam generator and supply the water to the u-shaped heating tube;
   a first connection tube that connects the water supply and drain tube and an inflow tube of the u-shaped heating tube;
   a branch tube branched so that steam and water discharged from the u-shaped heating tube are divided and the branch tube extends in parallel with the water supply and drain tube;
   a collection tube connected to the branch tube and the water supply and drain tube to collect the water discharged from the u-shaped heating tube into the water supply and drain tube;
   a second connection tube that connects the branch tube and a discharge tube of the u-shaped heating tube; and
   a steam discharge tube connected to the branch tube to provide a passage through which the steam flows out of the steam generator, wherein the u-shaped heating tube extends from the first connection tube to the second connection tube in the u-shape, wherein the first connection tube is inclined at a first angle from an end of the water supply and drain tube based on a direction in which the water supply and drain tube extends such that residual water is removed from the u-shaped heating tube, wherein the second connection tube extends inclined at a second angle from a first end of the branch tube based on a direction in which the branch tube extends such that residual water is removed from the u-shaped heating tube, and wherein the steam discharge tube extends inclined at a third angle from a second end of the branch tube based on the direction in which the branch tube extends such that a condensed water is introduced into the collection tube.

2. The steam generator according to claim 1, wherein the u-shaped heating tube comprises:
   the inflow tube into which the water is introduced;
   a steam generation tube connected to the inflow tube, the steam generation tube having a predetermined curvature; and
   the discharge tube connected to the steam generation tube to provide a passage through which the steam flows.

3. The steam generator according to claim 2, wherein the inflow tube is connected to the first connection tube in a straight line.

4. The steam generator according to claim 3, wherein the first angle is an angle ranging from about 15 degrees to about 30 degrees between a central axis of the water supply and drain tube and a central axis of the first connection tube.

5. The steam generator according to claim 2, wherein the discharge tube is connected to the second connection tube in a straight line.

6. The steam generator according to claim 5, wherein the second angle is an angle ranging from about 15 degrees to about 30 degrees between a central axis of the branch tube and a central axis of the second connection tube.

7. The steam generator according to claim 1, further comprising:
   a water level sensor installed in the collection tube to detect a water level.

8. The steam generator according to claim 7, further comprising:
   a temperature sensor installed in the heating tube to detect a temperature.

9. A cooking apparatus, comprising:
   a cavity having a cooking chamber;
   a steam generator configured to provide steam to the cooking chamber;
   a water supply tank configured to store water supplied to the steam generator; and
   a drain tank in which residual water of the steam generator is stored, wherein the steam generator comprises:
      a steam generation unit provided with at least one u-shaped heater configured to provide heat and an inclined u-shaped heating tube configured to receive the heat from the at least one u-shaped heater so as to generate steam, wherein the at least one u-shaped heater corresponds in shape to the inclined u-shaped heating tube and extends along an outer surface along a length thereof;
      an adaptor unit provided with a water supply and drain tube configured to supply water to the u-shaped heating tube;
      a first connection tube that connects the water supply and drain tube and an inflow tube of the u-shaped heating tube;
      a branch tube branched so that steam and water discharged from the u-shaped heating tube are divided and the branch tube extends in parallel with the water supply and drain tube;
      a collection tube connected to the branch tube and the water supply and drain tube to collect the water into the water supply and drain tube;
      a second connection tube that connects the branch tube and a discharge tube of the u-shaped heating tube; and
      a steam discharge tube configured to provide a passage through which the steam flows out of the steam generator, wherein the u-shaped heating tube extends from the first connection tube to the second connection tube in the u-shape, wherein the first connection tube is inclined at a first angle from an end of the water supply and drain tube based on a direction in which the water supply and drain tube extends such that residual water is removed from the u-shaped heating tube, wherein the second connection tube extends inclined at a second angle from a first end of the branch tube based on a direction in which the branch tube extends such that residual water is removed from the heating tube, and wherein the steam discharge tube extends inclined at a third angle from a second end of the branch tube based on the direction in which the branch tube extends such that a condensed water is introduced into the collection tube.

10. The cooking apparatus according to claim 9, wherein the water supply and drain tube comprises:
    a first valve provided in a passage connected to the water supply tank; and
    a second valve provided in a passage connected to the drain tank.

11. The cooking apparatus according to claim 10, wherein the steam generator further comprises a water level sensor configured to detect a water level, where switching operations of the first valve and the second valve are interlocked with each other according to information of the water level detected by the water level sensor.

12. A cooking appliance comprising the steam generator according to claim 1.

13. The steam generator according to claim 1, wherein the branch tube is in fluid communication with the steam generation tube, the steam discharge tube, and the water supply and drain tube, and is configured to direct steam to the steam discharge tube and residual water to the water supply and drain tube.

* * * * *